(12) United States Patent
Colby et al.

(10) Patent No.: US 8,837,131 B1
(45) Date of Patent: Sep. 16, 2014

(54) KEYBOARD AND FOLIO WITH SIZE ADJUSTMENT FOR TABLET COMPUTER

(71) Applicant: ZAGG Intellectual Property Holding Co., Salt Lake City, UT (US)

(72) Inventors: Jim Colby, Highland, UT (US); Dan Oakeson, West Jordan, UT (US); Collin S. Lewis, Wellsville, UT (US); Dennis LeGrand Olsen, Eagle Mountain, UT (US); Derek J. Shelley, Logan, UT (US); Kurt Lewis Jensen, Spanish Fork, UT (US)

(73) Assignee: ZAGG Intellectual Property Holding Co., Inc., Salt Lake City, UT (US)

( * ) Notice: Subject to any disclaimer, the term of this patent is extended or adjusted under 35 U.S.C. 154(b) by 1 day.

(21) Appl. No.: 14/085,229

(22) Filed: Nov. 20, 2013

(51) Int. Cl.
  *G06F 1/16* (2006.01)
  *H05K 5/00* (2006.01)
  *H05K 7/00* (2006.01)

(52) U.S. Cl.
  CPC .................................. *G06F 1/1667* (2013.01)
  USPC ............ 361/679.06; 361/679.09; 361/679.27; 361/679.29

(58) Field of Classification Search
  USPC .............. 361/679.06–679.09, 679.26–679.29
  See application file for complete search history.

(56) References Cited

U.S. PATENT DOCUMENTS

| | | | |
|---|---|---|---|
| 6,517,129 B1 * | 2/2003 | Chien et al. | 292/251.5 |
| 6,694,570 B2 * | 2/2004 | Chen | 16/367 |
| 6,785,128 B1 * | 8/2004 | Yun | 361/679.27 |
| 7,017,243 B2 * | 3/2006 | Carnevali | 24/523 |
| 7,129,931 B2 * | 10/2006 | Pappas | 345/168 |
| 7,626,357 B2 * | 12/2009 | Hoffman et al. | 320/110 |
| 8,385,063 B2 * | 2/2013 | Zhu et al. | 361/679.58 |
| 2010/0172081 A1 * | 7/2010 | Tian et al. | 361/679.29 |

OTHER PUBLICATIONS

'Big Blue'-Tooth™ Keyboards & LARGEKeys Keyboards; http://rjcooper.com/big-blue-tooth-keyboard/index.html; accessed Nov. 20, 2013; 5 pages.
Belkin, Portable Keyboard Case for iPad mini; www.belkinbusiness.com/products; accessed Nov. 20, 2013; 1 page.
Belkin; Portable Keyboard Case for 7" Tablets Tablets; www.belkinbusinee.com/products; accessed Nov. 20, 2013; 2 pages.
Cooper Infinite Universal 8"—10" Tablet Folio; www.tablet2cases.com/cooper-infinite-universal-8-10-tablet-folio; accessed Nov. 20, 2013; 8 pages.
The gadgeteer; ZAGG introduces a Universal Bluetooth Keyboard—thegadgeteer.com/2013/07/23/zagg-introducesa-universal-bluetooth-keyboard/; accessed Nov. 20, 2013; 7 pages.

(Continued)

*Primary Examiner* — Tuan T Dinh
(74) *Attorney, Agent, or Firm* — Thorpe North & Western LLP (57) ABSTRACT

A folio for use with a tablet computer comprises a pair of leafs pivotally coupled together at a hinge with a keyboard carried by one of the pair of leafs, and another of the pair of leafs carrying the tablet computer and defining a cover for the keyboard in the closed configuration. A fixed top stop is fixed to the cover opposite the hinge and extends outwardly from the cover configured to abut to the tablet computer. A sliding shelf is movably coupled to the cover adjacent the hinge and opposite the fixed top stop to receive the tablet computer thereon in the open configuration. Bias means is coupled to the sliding shelf for biasing the sliding shelf towards the fixed top stop.

18 Claims, 7 Drawing Sheets

(56) References Cited

OTHER PUBLICATIONS

ThinkPad Helix; Tablet Laptop Hybrid. ThinkPad Helix Ultrabook Laptop; Lenovo; accessed Nov. 20, 2013; 2 pages.

Tmart; Black Friday; 6-8 Universal Tablet PC Leather Case Cover with Plug-in Card Yellow—Tmart.com; accessed Nov. 20, 2013; 3 pages.

Wholesale—7 inch 8 inch 9 inch 10 inch 10.1 inch tablet case folio PU leather adjustable case cover sheath; http://www.dhgate.com/product/7-inch-8inch-9inch-9-7inch-10-inch-10-1; 1 page.

Wholesale—DHL Freeshipping 10" 10.1" Inch Tablet PC USB Keyboard Cover Leather Case for 10" 10.1" 10.@" MID Tablet Best Gift for Christmas; accesssed Nov. 20, 2013; 1 page.

Wholesale—Hot PU Leather Case Cover Hoilder with Wireless Bluetooth Keyboard for iPad Mini with Stand Function Green Free Shipping; hhttp://image.dhgate.com/albu_367587927_00-1.0x0/hot-pu- leather-case-cover-holder-with-wireless; accessed Nov. 20, 2013; 1 page.

\* cited by examiner

Fig. 12

KEYBOARD AND FOLIO WITH SIZE ADJUSTMENT FOR TABLET COMPUTER

BACKGROUND

1. Field of the Invention

The present invention relates generally to keyboard folios to receive a tablet computer and add keyboard function to the tablet computer.

2. Related Art

Tablet computers or tablets, such as the Apple® iPad® tablet computer, have grown in popularity. Such tablet computers are often thin, rectilinear computers with a broad touch screen that can offer media viewing and user input through a graphical keyboard.

Tablet computers risk damage from dropping because their small size and light weight promote mobility and holding. Often, the tablet computer has a slim, streamline case that is aesthetically pleasing but difficult to grasp and hold. User's often supplement the tablet computer with a case or folio to protect the screen and the tablet computer. Such cases or folios can often enclose or envelope the back, edges, and front perimeter of the tablet computer. Other cases can grip or pinch the tablet computer.

Typing or keyed entry on the tablet computers can be difficult due to the lack of haptic or tactile response of the graphical keyboard, and the large amount of space required by the graphical keyboard leaves a small viewing area. User's often supplement the tablet computer with a wireless keyboard to facilitate typing or keyed entry. Such wireless keyboards can also be incorporated into the case or folio. Again, such cases or folios can often enclose or envelope the back, edges, and front perimeter of the tablet computer. Alternatively, such keyboards can have a tray to receive the tablet computer thereon.

Although such tablet computers come in competing sizes or families, such as with 7, 8 and 10 inch screens, or thereabouts, there is a variation in outer dimensions or sizes. The variation in size often means that folios or cases must be custom sized for a particular brand and model of tablet computer. Some users own more than one tablet having different brands and/or sizes of tablet computers.

SUMMARY OF THE INVENTION

It has been recognized that it would be advantageous to develop a folio or case for a laptop computer that has a keyboard and can accept various different sizes of tablet computer and/or various different brands or models.

The invention provides a folio for use with a tablet computer comprising a pair of leafs pivotally coupled together at a hinge. The pair of leafs has a closed configuration in which the pair of leafs are substantially parallel with interior surfaces facing towards one another, and an open configuration in which the pair of leafs is oriented transverse with respect to one another and with the interior surfaces forming an obtuse angle with respect to one another. A keyboard is carried by one of the pair of leafs. Another of the pair of leafs carries the tablet computer, and defines a cover for the keyboard in the closed configuration. A fixed top stop is fixed to the cover opposite the hinge, and extends outwardly from the cover to abut to the tablet computer. A sliding shelf is movably coupled to the cover adjacent the hinge and opposite the fixed top stop to receive the tablet computer thereon in the open configuration. Bias means is coupled to the sliding shelf for biasing the sliding shelf towards the fixed top stop.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

Definitions

The terms "tablet computer" and "tablet" are used interchangeably herein to refer to a computer or multi-media device that is one-piece with a screen and that is portable and handheld. Examples of tablets include the Apple™ iPad™, the Samsung™ Galaxy™ Tab™, Samsung™ Galaxy™ Note™, Google™ Nexus™, etc. The screen can be a touch screen that can receive input by touch such as finger swipes, and/or can have a virtual keyboard. The tablet can be wide (or broad) and thin. For example, the screen can have a diagonal length greater than 7 inches, and a thickness less than a ¼-½ inch. The tablet can have a battery and memory and a processor with software running thereon. The tablet can have WiFi and Bluetooth connectivity. Thus, the tablet can provide internet browsing, game playing, movie and picture display, e-book display, etc. In addition, the tablet can include a digital camera. In addition, such tablet computers can have a rectangular shape with a longer height and a narrower width (in a portrait orientation), and with a landscape orientation commonly utilized with keyboards in which the width is vertical and the height is horizontal. Furthermore, such tablets can have different widths between brands and/or models. For example, a first tablet computer and a second different tablet computer that can have a different width w2 or height than a width w1 of the first tablet computer.

Description

As illustrated in FIGS. 1-12, a folio or case, indicated generally at 10, in an example implementation in accordance with the invention is shown for use with tablet computers, such a first wider tablet computer 14a and a second narrower tablet computer 14b. The folio can be a universal folio with a universal or adjustable fit for a plurality of different tablet computers having different sizes and/or widths. In addition, the folio can accommodate different size or width tablet computers with one tablet computer easily and readily replacing another in the folio. The folio can provide automatic and secure or firm retention of tablet computers of different widths.

Figure 2:
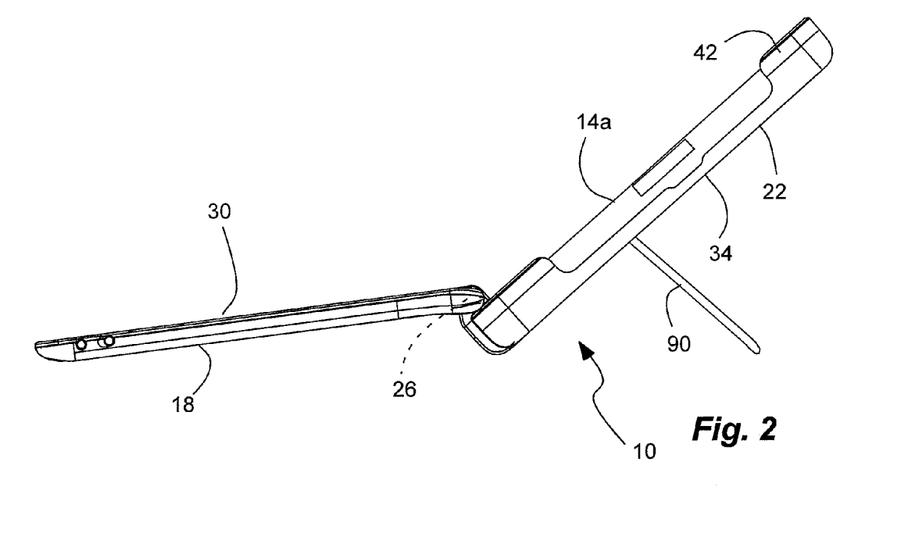
FIG. 2 is a side view of the folio of FIG. 1.
Figure 3:
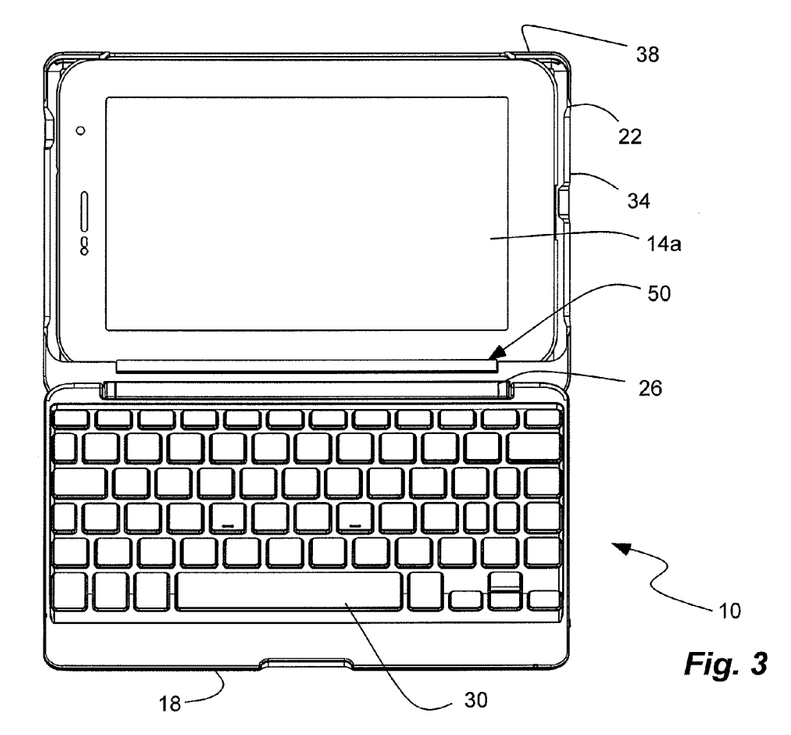
FIG. 3 is a top view of the folio of FIG. 1.
Figure 4:
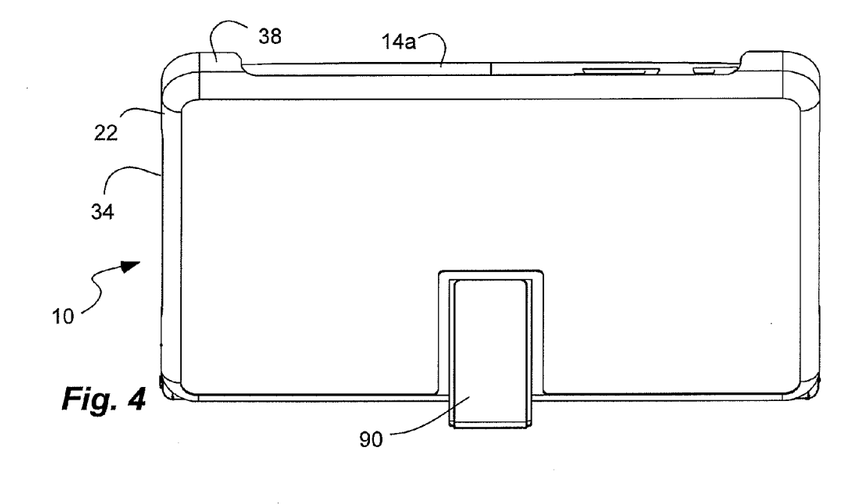
FIG. 4 is a back view of the folio of FIG. 1.
Figure 5:
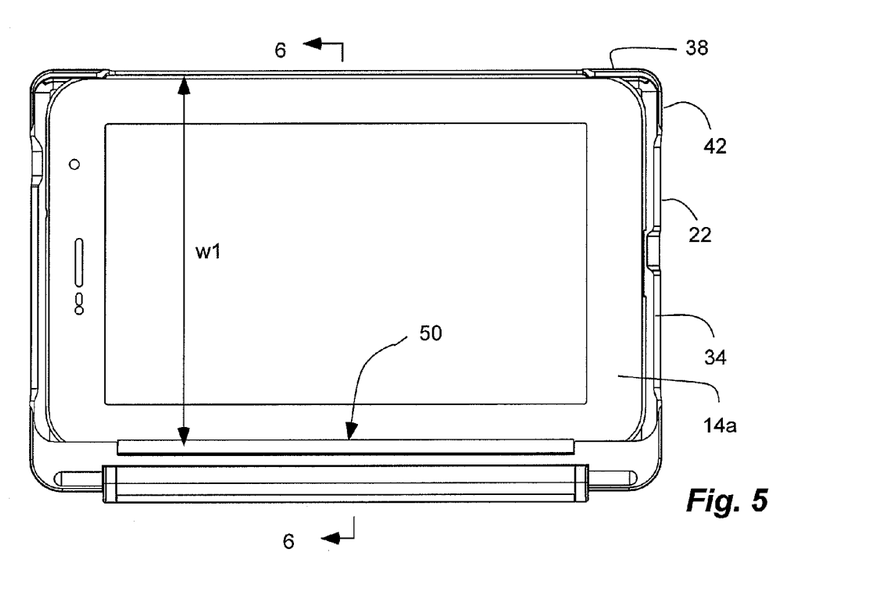
FIG. 5 is a partial front view of the folio of FIG. 1, shown with a keyboard removed and with the first wider tablet computer and with a slidable shelf in a lowered position.
Figure 6:
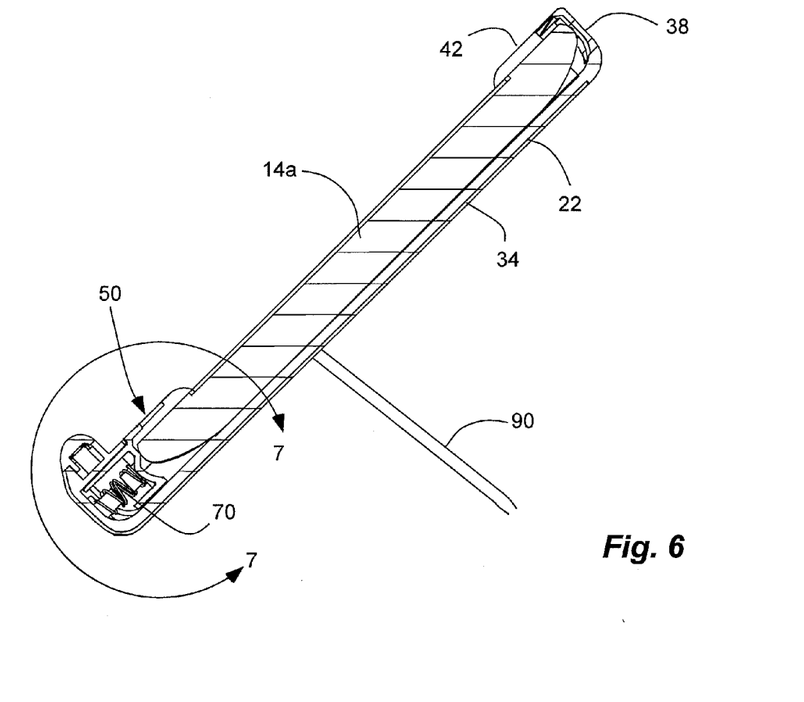
FIG. 6 is a partial cross-sectional side view of the folio of FIG. 1, taken along line 6 of FIG. 5, shown with the keyboard removed and with the first wider tablet computer and with a slidable shelf in the lowered position.

The folio 10 comprises a pair of leafs 18 and 22 pivotally coupled together at a hinge 26. A keyboard 30 can be carried by one of the pair of leafs 18. Another of the pair of leafs 22 can define a cover 34 for the keyboard, and which carries the tablet computer. The pair of leafs, or the keyboard and the cover 30 and 34, can have a closed configuration in which the pair of leafs, or the keyboard and the cover, is substantially parallel, with interior surfaces facing towards one another. In addition, the pair of leafs, or the keyboard and the cover, can have an open configuration in which the pair of leafs, or the keyboard and the cover, is oriented transverse with respect to one another; and with the interior surfaces forming an obtuse angle with respect to one another, as shown in FIG. 2. The cover 34 can carry the tablet computer in the open and the closed configurations, and can cover the keyboard in the closed configuration. The pair of leafs, and the keyboard and the cover, can be flat and rigid. The keyboard and the cover have adjacent edges pivotally coupled together by the hinge. The cover 34 can have a proximal, hinged edge, while the keyboard can have a distal hinged edge. In addition, the cover 34 can have a distal, free edge, while the keyboard can have a proximal free edge.

The cover 34 has a fixed top stop 38 fixed to the cover opposite the hinge 26, or the distal, free edge. The fixed top stop 38 extends outwardly from the cover 34 at a right angle or orthogonal angle with respect to the cover. The fixed top stop abuts to the tablet computer. In one aspect, the fixed top stop can be disposed at opposite lateral ends or sides of the cover, with an open space therebetween to allow access to buttons or controls of the tablet computer while the tablet computer is carried by the cover. In another aspect, the fixed top stop can extend a length or a width of the cover. In one aspect, the fixed top stop can include a pair of opposite legs extending perpendicularly or orthogonally from the fixed top stop along the ends or sides of the cover to provide and to define lateral stops 42 to resist lateral movement of the tablet computer with respect to the cover. In one aspect, the lateral stops can be disposed at top and bottom ends or sides of the cover, with an open space therebetween to allow access to buttons or controls of the tablet computer while the tablet computer is carried by the cover. The fixed top stop and lateral stops can be located at corners of the cover.

Figure 1:
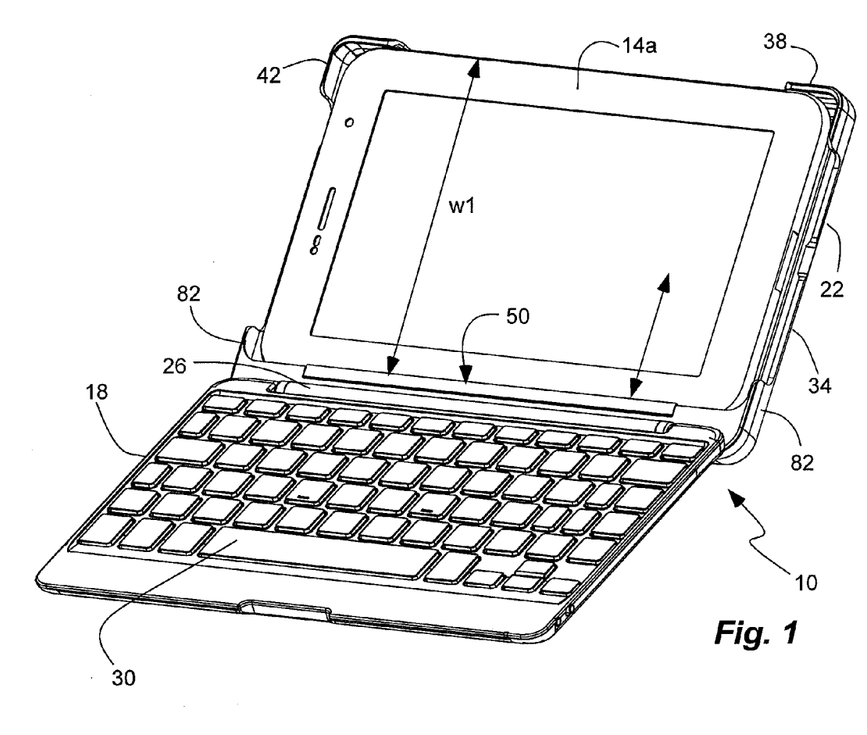
FIG. 1 is a perspective view of a folio in accordance with an embodiment of the present invention shown with a first wider tablet computer and shown in an open configuration.
Figures 7, 10:
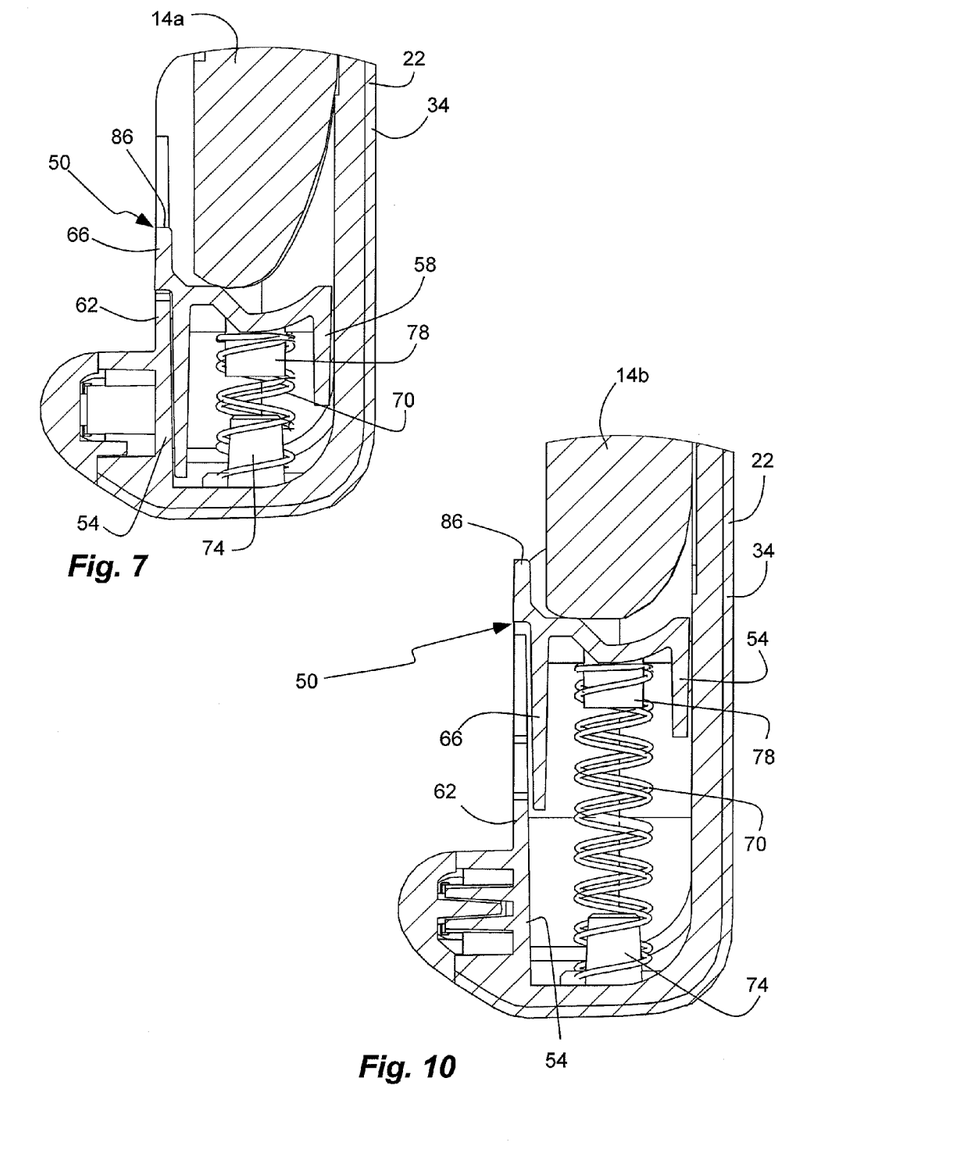
FIG. 7 is a detailed cross-sectional side view of the folio of FIG. 1, taken along line 7 of FIG. 6, shown with the keyboard removed and with the first wider tablet computer and with the slidable shelf in the lowered position.
FIG. 10 is a detailed cross-sectional side view of the folio of FIG. 1, taken along line 10 of FIG. 9, shown with the keyboard removed and with the first wider tablet computer and with the slidable shelf in the raised position.
Figure 8:
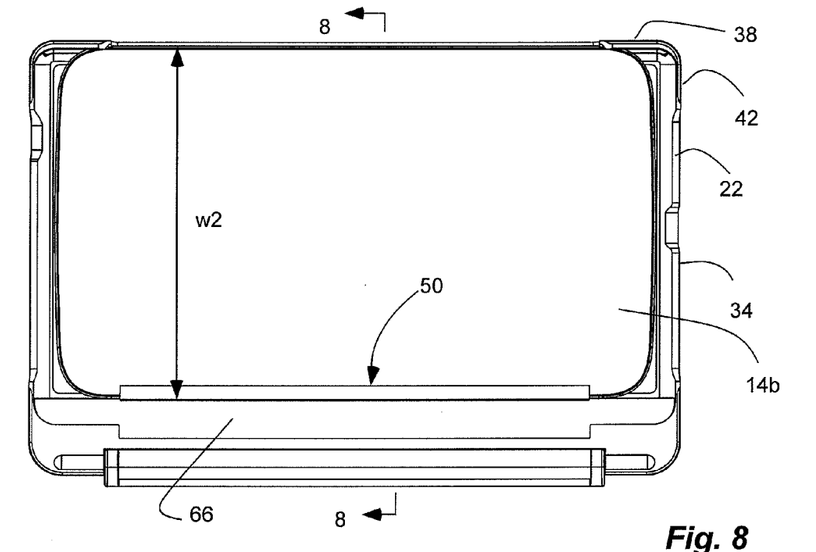
FIG. 8 is a partial front view of the folio of FIG. 1, shown with the keyboard removed and with a second narrower tablet computer and with the slidable shelf in a raised position.
Figure 9:
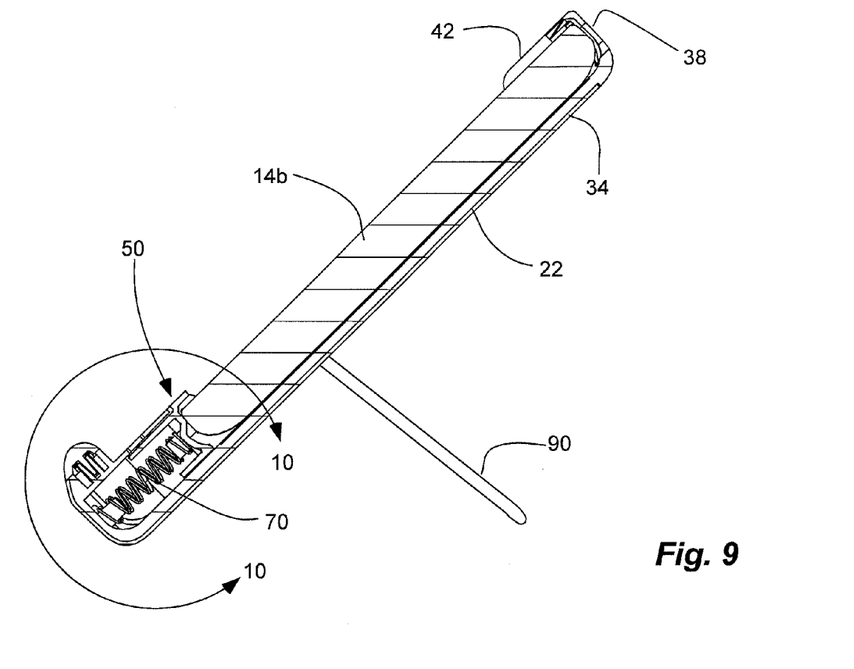
FIG. 9 is a partial cross-sectional side view of the folio of FIG. 1, taken along line 9 of FIG. 8, shown with the keyboard removed and with the second narrower tablet computer and with the slidable shelf in the raised position.
Figure 11:
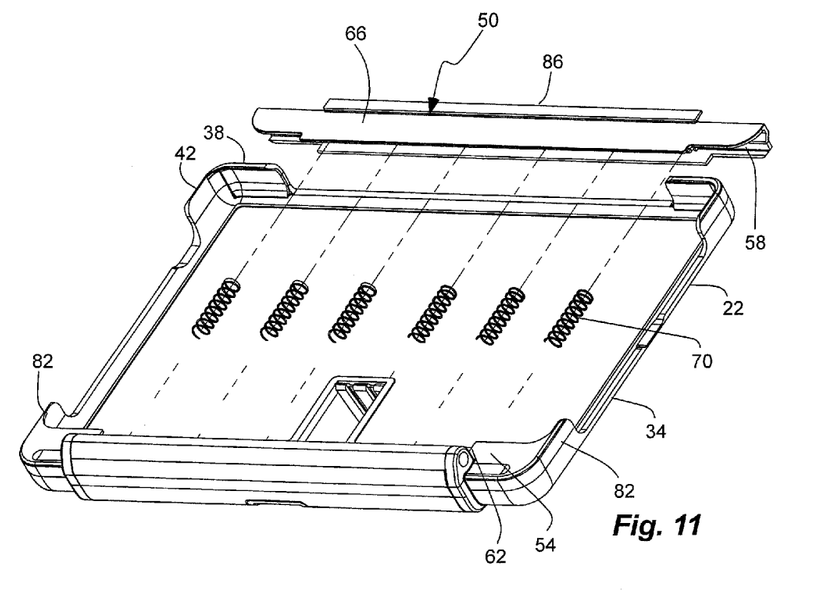
FIG. 11 is an exploded perspective view of a cover of the folio of FIG. 1.
Figure 12:
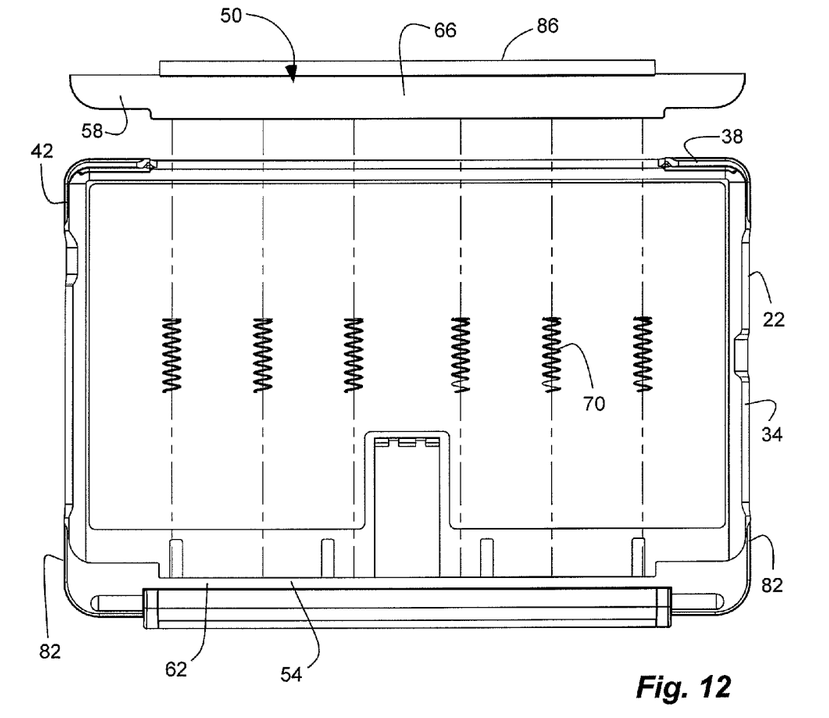
FIG. 12 is an exploded front view of the cover of the folio of FIG. 1.

A sliding shelf or tray 50 is movably coupled to the cover 34 adjacent the hinge 26, and the proximal, hinge edge, and opposite the fixed top stop 38. The sliding shelf 50 receives the tablet computer thereon in the open configuration, as shown in FIG. 1. The sliding shelf 50 can slide or displace up and down on the cover to define a variable height between the sliding shelf and the top stop. In one aspect, the sliding shelf can have a distance or path of travel between 1 inch and ¼ inch. In another aspect, the sliding shelf can have a distance or path of travel of ½ inch. The sliding shelf 50 can have a retracted or lowermost or lowered position closer to the hinge, as shown in FIGS. 1, 5, 6 and 7, and corresponding to a greater distance. In addition, the sliding shelf 50 can have an extended or raised position closer to the top stop, as shown in FIGS. 8-10, and corresponding to a lesser distance.

A pair of nesting channels can be formed between the sliding shelf 50 and the proximal, hinge edge of the cover. The pair of nesting channels can include a bottom channel 54, and a shelf channel 58 nesting in the bottom channel, as shown in FIGS. 7 and 10. The bottom channel 54 is formed in the cover adjacent the hinge, or in the proximal, hinge edge, and faces towards the sliding shelf 50, or generally upwards in the open configuration. The shelf channel 58 is formed in a bottom of the shelf 50, and faces towards the bottom channel 54 of the cover. The shelf channel 58 is received in or nests within the bottom channel 54, and slides into and out of the bottom channel between the retracted and raised positions, respectively. The bottom channel receives the sliding shelf therein in a lowermost position of the sliding shelf. Each of the bottom and shelf channels has a front wall 62 and 66, respectively. The front walls 62 and 66 of the channels 54 and 58 overlap one another along a distance of travel of the sliding shelf. Thus, the front walls cover the channels even in the raised position, as shown in FIG. 10.

The sliding shelf 50 is biased towards the extended or raised positions. Thus, the sliding shelf can collapse on the tablet computer to hold the tablet computer in the cover, between the sliding shelf and the top stop. A plurality of springs 70 can be arrayed along the width of the sliding shelf 50. A plurality of lower posts 74 can be disposed in the bottom channel 54. Similarly, a plurality of upper posts 78 can be disposed in the shelf channel 58 and aligned with the lower posts. The plurality of springs 70 can be carried between the plurality of posts 74 and 78 in the bottom channel and in the shelf channel. The array of springs is an example of one bias means coupled to the sliding shelf for biasing the sliding shelf towards the fixed top stop. Other biasing means can include, by way of example, one or more coil springs, one or more leaf springs, one or more elastic members, etc. The overlapping front walls of the channels can also cover the springs even in the raised position, as shown in FIG. 10. The bias means can disposed between the channels for biasing the sliding shelf towards the fixed top stop.

The sliding shelf 50 can extend an entire width of the cover 34. A pair of opposite tracks 82 can be located on opposite sides of the cover 34. The pair of opposite tracks 82 can slidably receive the sliding shelf 50 therebetween. Thus, the tracks 82 can cover the ends of the channels. In addition, the opposite tracks can guide movement of the shelf on the cover.

A lip 86 can be formed on a front end or edge of the sliding shelf 50 to help retain the tablet computer on the shelf. In addition, an upper channel can be formed in a top of the sliding shelf to receive an edge of the tablet computer.

As described above, a tablet computer is carried by the cover 34, and held between the sliding shelf 50 and the top stop 38. The sliding shelf 50 is movable towards the tablet computer so that a distance between the sliding shelf 50 and the top stop 38 equals a width or a height of the tablet computer therebetween. As described above, the folio 10 can be a universal folio with a universal or adjustable fit for a plurality of different tablet computers having different sizes and/or widths. In addition, the folio can accommodate different size or width tablet computers with one tablet computer easily and readily replacing another in the folio. The folio can provide automatic and secure or firm retention of tablet computers of different widths. For example, a first wider tablet computer 14a can be larger or wider, and can have a wider width w1, and a second narrower different tablet computer 14b can be smaller or narrower, and can have a different narrower width w2 narrower than the first tablet computer. The second tablet computer 14b can replace the first tablet computer 14a carried by the cover 34, and held between the sliding shelf 50 and the top stop 38, with the sliding shelf 50 movable towards the second tablet computer 14b so that a second distance between the sliding shelf and the top stop equals the different width or a height of the second tablet computer therebetween, and vise versa.

A method for using the folio 10 described above, and for supporting a tablet computer with the folio, can comprise opening the pair of leafs 18 and 22, or the keyboard and cover 30 and 34, and placing the folio, leaf 18 or keyboard 30 on a support surface, as shown in FIGS. 1 and 2. An edge of the tablet computer 14a can be placed against the sliding shelf 50. The tablet computer 14a, and thus the sliding shelf 50, can be pushed towards the hinge 26 or the proximal hinge edge of the cover. The tablet computer 14a can rest against the cover 34, or a back of the tablet computer can lean back against the cover. The tablet computer can be released to allow the bias means, or springs 70, to slide the tablet computer 14a along the cover to abut to the top stop 38, or so that an opposite edge of the tablet computer abuts to the top stop. The keyboard and tablet computer can be used in conjunction with one another, with the tablet computer carried by and held by the cover and the folio. Subsequently, the tablet computer 14a can be pressed against the sliding shelf 50 to slide the tablet computer towards the hinge 26, or proximal hinge edge of the cover, and away from the top stop. The tablet computer 14a can be lifted away from the cover 34 and the folio 10. As described above, a second different tablet computer 14b can replace the first table computer 14a in the folio and in the cover. An edge of a different tablet computer 14b with different dimensions can be placed against the sliding shelf 50. The different tablet computer, and thus the sliding shelf, can be pressed towards the hinge 26, or the proximal hinge edge of the cover. The different tablet computer 14b can be rested against the cover 34 as described above. The different tablet computer 14b can be released to allow the bias means, or springs 70, to slide the different tablet computer 14b along the cover to abut to the top stop 38. Again, the keyboard 30 and tablet computer 14b can be used in conjunction with one another, with the tablet computer 14b carried by and held by the cover and the folio. Subsequently, the tablet computer 14b can be pressed against the sliding shelf 50 to slide the tablet computer towards the hinge 26, or proximal hinge edge of the cover, and away from the top stop, to remove the tabled computer 14b. In addition, the pair of leafs 18 and 22, or the keyboard and cover 30 and 34, can be folded with the keyboard 30 against the cover 34 and the tablet computer, either 14a or 14b, therebetween.

The leaf 22 or the cover 34 can be provided with a kickstand 90 pivotally coupled to an intermediate location on a rear of the cover, and foldable to or into the cover, and away from the cover to provide support to the cover and the tablet computer on the support surface.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A folio device configured for use with a tablet computer, the device comprising:
  a) a pair of leafs pivotally coupled together at a hinge and having a closed configuration in which the pair of leafs are substantially parallel with interior surfaces facing towards one another, and an open configuration in which the pair of leafs is oriented transverse with respect to one another and with the interior surfaces forming an obtuse angle with respect to one another;
  b) a keyboard carried by one of the pair of leafs;
  c) another of the pair of leafs configured to carry the tablet computer and defining a cover for the keyboard in the closed configuration;
  d) a fixed top stop fixed to the cover opposite the hinge and extending outwardly from the cover configured to abut to the tablet computer;
  e) a sliding shelf movably coupled to the cover adjacent the hinge and opposite the fixed top stop and configured to receive the tablet computer thereon in the open configuration;
  f) bias means coupled to the sliding shelf for biasing the sliding shelf towards the fixed top stop; and
  g) the sliding shelf extending a width of the cover between opposite lateral sides of the cover.

2. The folio device in accordance with claim 1, wherein a variable height is defined between the sliding shelf and the top stop.

3. The folio device in accordance with claim 1, further comprising:
  a lip on a front end of the sliding shelf.

4. The folio device in accordance with claim 1, further comprising:
  a pair of opposite tracks located on opposite sides of the cover, the pair of opposite tracks slidably receiving the shelf therebetween.

5. The folio device in accordance with claim 1, further comprising:
  a bottom channel formed in the cover adjacent the hinge and facing towards the sliding shelf, and receiving the sliding shelf therein in a lowermost position.

6. The folio device in accordance with claim 1, further comprising:
  a pair of nesting channels including a bottom channel and a shelf channel nesting in the bottom channel;
  the bottom channel formed in the cover adjacent the hinge and facing towards the sliding shelf; and
  the shelf channel formed in a bottom of the shelf and facing towards the bottom channel of the cover.

7. The folio device in accordance with claim 1, wherein the bias means comprises a plurality of springs arrayed along a width of the sliding shelf.

8. The folio device in accordance with claim 1, wherein the sliding shelf has a lowered position closer to the hinge, and a raised position closer to the top stop.

9. The folio device in accordance with claim 1, in combination with a tablet computer carried by the cover and held between the sliding shelf and the top stop, with the sliding shelf movable towards the tablet computer so that a distance between the sliding shelf and the top stop equals a width or a height of the tablet computer therebetween.

10. The folio device in accordance with claim 1, wherein the sliding shelf extends between lateral stops at opposite lateral sides of the cover.

11. The folio device in accordance with claim 1, further comprising an upper channel formed in a top of the sliding shelf.

12. The folio device in accordance with claim 6, further comprising:
 a plurality of lower posts disposed in the bottom channel;
 a plurality of upper posts disposed in the shelf channel; and
 a plurality of springs carried between the plurality of posts in the bottom channel and in the shelf channel.

13. The folio device in accordance with claim 6, wherein each of the channels has a front wall; and wherein the front walls of the channels overlap one another along a distance of travel of the sliding shelf.

14. The combination in accordance with claim 9, wherein the tablet computer is a first tablet computer, and further in combination with a second different tablet computer having a different width or height than the first tablet computer, and replacing the first tablet computer carried by the cover and held between the sliding shelf and the top stop, with the sliding shelf movable towards the second tablet computer so that a second distance between the sliding shelf and the top stop equals the different width or a height of the second tablet computer therebetween.

15. A folio device in combination with a first wider tablet computer and a second narrower tablet computer each selectively and replaceably carried by the folio device, the device comprising:
 a) a pair of leafs pivotally coupled together at a hinge and having a closed configuration in which the pair of leafs are substantially parallel with interior surfaces facing towards one another, and an open configuration in which the pair of leafs is oriented transverse with respect to one another and with the interior surfaces forming an obtuse angle with respect to one another;
 b) a keyboard carried by one of the pair of leafs;
 c) another of the pair of leafs defining a cover for the keyboard in the closed configuration;
 d) a fixed top stop fixed to the cover opposite the hinge and extending outwardly from the cover;
 e) a sliding shelf movably coupled to the cover adjacent the hinge and opposite the fixed top stop;
 f) the shelf extending a width of the cover between opposite lateral sides of the cover;
 g) a lip on a front end of the sliding shelf;
 h) a pair of opposite tracks located on opposite sides of the cover, the pair of opposite tracks slidably receiving the shelf therebetween;
 i) a bottom channel formed in the cover adjacent the hinge and facing towards the sliding shelf, and receiving the sliding shelf therein in a lowermost position;
 j) a shelf channel formed in a bottom of the shelf and facing towards the bottom channel of the cover;
 k) bias means disposed between the channels for biasing the sliding shelf towards the fixed top stop;
 l) each of the channels having a front wall, and the front walls of the channels overlapping one another along a distance of travel of the sliding shelf; and
 m) the sliding shelf having a lowered position closer to the hinge with the first wider tabled computer held between the sliding shelf and the top stop, with the sliding shelf movable towards the first wider tablet computer so that a first wider distance between the sliding shelf and the top stop equals a width of the first wider tablet computer therebetween, and a raised position closer to the top stop with the second narrower tablet computer replacing the first wider tablet computer and held between the sliding shelf and the top stop, with the sliding shelf movable towards the second narrower tablet computer so that a second narrower distance between the sliding shelf and the top stop equals a different width of the second narrower tablet computer therebetween.

16. The combination in accordance with claim 15, wherein the biasing means further comprises:
 a plurality of lower posts disposed in the bottom channel;
 a plurality of upper posts disposed in the shelf channel; and
 a plurality of springs carried between the plurality of posts in the bottom channel and in the shelf channel.

17. A folio device configured to selectively and replaceably carry a first wider tablet computer and a second narrower tablet computer, the device comprising:
 a) a pair of leafs pivotally coupled together at a hinge and having a closed configuration in which the pair of leafs are substantially parallel with interior surfaces facing towards one another, and an open configuration in which the pair of leafs is oriented transverse with respect to one another and with the interior surfaces forming an obtuse angle with respect to one another;
 b) a keyboard carried by one of the pair of leafs;
 c) another of the pair of leafs configured to carry one of the tablet computers and defining a cover for the keyboard in the closed configuration;
 d) a fixed top stop fixed to the cover opposite the hinge and extending outwardly from the cover configured to abut to one of the tablet computers;
 e) a sliding shelf movably coupled to the cover adjacent the hinge and opposite the fixed top stop and configured to receive one of the tablet computers thereon in the open configuration;
 f) the shelf extending a width of the cover between opposite lateral sides of the cover;
 g) a lip on a front end of the sliding shelf;
 h) a pair of opposite tracks located on opposite sides of the cover, the pair of opposite tracks sliding receiving the shelf therebetween;
 i) a bottom channel formed in the cover adjacent the hinge and facing towards the sliding shelf, and receiving the sliding shelf therein in a lowermost position;
 j) a shelf channel formed in a bottom of the shelf and facing towards the bottom channel of the cover;
 k) bias means disposed between the channels for biasing the sliding shelf towards the fixed top stop;
 l) each of the channels having a front wall, and the front walls of the channels overlapping one another along a distance of travel of the sliding shelf; and
 m) the sliding shelf having a lowered position closer to the hinge configured to receive the first wider tabled computer held between the sliding shelf and the top stop, with the sliding shelf configured to be movable towards the first wider tablet computer so that a first wider distance between the sliding shelf and the top stop equals a width of the first wider tablet computer therebetween, and a raised position closer to the top stop configured to receive the second narrower tablet computer replacing the first wider tablet computer and held between the sliding shelf and the top stop, with the sliding shelf configured to be movable towards the second narrower tablet computer so that a second narrower distance between the sliding shelf and the top stop equals a different width of the second narrower tablet computer therebetween.

18. A folio device configured for use with a tablet computer, the device comprising:
   a) a pair of leafs pivotally coupled together at a hinge and having a closed configuration in which the pair of leafs are substantially parallel with interior surfaces facing towards one another, and an open configuration in which the pair of leafs is oriented transverse with respect to one another and with the interior surfaces forming an obtuse angle with respect to one another;
   b) a keyboard carried by one of the pair of leafs;
   c) another of the pair of leafs configured to carry the tablet computer and defining a cover for the keyboard in the closed configuration;
   d) a fixed top stop fixed to the cover opposite the hinge and extending outwardly from the cover configured to abut to the tablet computer;
   e) a sliding shelf movably coupled to the cover adjacent the hinge and opposite the fixed top stop and configured to receive the tablet computer thereon in the open configuration;
   f) bias means coupled to the sliding shelf for biasing the sliding shelf towards the
   g) a lip on a front end of the sliding shelf;
   h) the sliding shelf extending a width of the cover between opposite lateral sides of the cover.

* * * * *